United States Patent
Giaretta et al.

(10) Patent No.: US 9,603,085 B2
(45) Date of Patent: Mar. 21, 2017

(54) METHODS AND APPARATUS PROVIDING INTELLIGENT RADIO SELECTION FOR LEGACY AND NON-LEGACY APPLICATIONS

(75) Inventors: Gerardo Giaretta, San Diego, CA (US); David William Craig, San Diego, CA (US); Julien H. Laganier, San Diego, CA (US); Haipeng Jin, Carlsbad, CA (US); Jay Kumar Sundararajan, San Diego, CA (US); Kalle Ilmari Ahmavaara, San Diego, CA (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 13/028,081

(22) Filed: Feb. 15, 2011

(65) Prior Publication Data

US 2011/0201285 A1 Aug. 18, 2011

Related U.S. Application Data

(60) Provisional application No. 61/305,087, filed on Feb. 16, 2010, provisional application No. 61/305,091, filed on Feb. 16, 2010.

(51) Int. Cl.
*H04W 48/18* (2009.01)
(52) U.S. Cl.
CPC .................. *H04W 48/18* (2013.01)
(58) Field of Classification Search
CPC ..... H04W 88/06; H04W 48/18; H04W 40/02; H04W 28/18; H04W 48/20; H04W 80/04; H04W 88/08; H04L 2012/2841; H04L 41/0859; H04L 41/12; H04L 45/306;
(Continued)

(56) References Cited

U.S. PATENT DOCUMENTS

| | | |
|---|---|---|
| 5,737,687 A | 4/1998 | Martin et al. |
| 6,115,744 A | 9/2000 | Robins et al. |
| 6,122,514 A | 9/2000 | Spaur et al. |

(Continued)

FOREIGN PATENT DOCUMENTS

| | | |
|---|---|---|
| CN | 101145949 A | 3/2008 |
| CN | 102186167 A | 9/2011 |

(Continued)

OTHER PUBLICATIONS

International Search Report and Written Opinion—PCT/US2011/025107—ISA/EPO—Jun. 1, 2011.

(Continued)

*Primary Examiner* — Sujatha Sharma
(74) *Attorney, Agent, or Firm* — Jia J. Wu (57) ABSTRACT

Methods and apparatus providing intelligent interface selection for legacy and non-legacy applications. The method includes intercepting a networking function call from an application desiring radio access, selecting a radio from a plurality of candidate radios based on selection criteria, and binding the radio to the application. To facilitate flow mobility, the method includes allocating an ephemeral port to the radio, generating a flow binding rule based only on the ephemeral port, and signaling the flow binding rule to a home agent.

42 Claims, 7 Drawing Sheets

(58) Field of Classification Search
CPC . H04L 45/308; H04L 12/5692; H04L 63/166; H04L 67/125; H04L 67/34; H04L 69/162
USPC ... 455/424, 62, 434, 552.1, 574, 550.1, 417, 455/452.2, 435.3, 509, 512, 557, 41.3
See application file for complete search history.

(56) References Cited

U.S. PATENT DOCUMENTS

| | | |
|---|---|---|
| 6,181,919 B1 | 1/2001 | Ozluturk |
| 6,198,911 B1 | 3/2001 | Lea et al. |
| 7,054,295 B1 | 5/2006 | Nitta |
| 7,065,367 B2 | 6/2006 | Michaelis et al. |
| 7,107,063 B1 | 9/2006 | Bates et al. |
| 7,251,490 B2 | 7/2007 | Rimoni |
| 7,486,954 B2 | 2/2009 | Lee et al. |
| 7,552,441 B2* | 6/2009 | Lim et al. ............ 719/312 |
| 7,610,057 B2* | 10/2009 | Bahl et al. ............ 455/522 |
| 7,664,838 B2 | 2/2010 | Monga et al. |
| 7,756,068 B2 | 7/2010 | Tao et al. |
| 7,769,887 B1 | 8/2010 | Bhattacharyya et al. |
| 7,860,469 B2 | 12/2010 | Mohanty et al. |
| 7,873,746 B2* | 1/2011 | Li ............ 709/246 |
| 7,940,735 B2* | 5/2011 | Kozisek et al. ............ 370/338 |
| 7,990,897 B2* | 8/2011 | Jing et al. ............ 370/255 |
| 8,169,935 B2* | 5/2012 | Taaghol et al. ............ 370/254 |
| 8,312,531 B2* | 11/2012 | Walter et al. ............ 726/14 |
| 8,472,322 B2 | 6/2013 | Black et al. |
| 8,831,658 B2 | 9/2014 | Meylan et al. |
| 8,838,086 B2 | 9/2014 | Giaretta et al. |
| 9,178,965 B2 | 11/2015 | Kondratiev |
| 9,264,868 B2 | 2/2016 | Giaretta et al. |
| 2002/0001292 A1 | 1/2002 | Miyamoto |
| 2002/0052790 A1 | 5/2002 | Tomishima |
| 2002/0095524 A1 | 7/2002 | Sanghvi et al. |
| 2002/0123356 A1 | 9/2002 | Michaud et al. |
| 2003/0134632 A1 | 7/2003 | Loughran |
| 2003/0153317 A1 | 8/2003 | Friman et al. |
| 2004/0009751 A1 | 1/2004 | Michaelis et al. |
| 2004/0097254 A1 | 5/2004 | Laroia et al. |
| 2004/0158729 A1 | 8/2004 | Szor |
| 2004/0172481 A1 | 9/2004 | Engstrom |
| 2004/0192391 A1 | 9/2004 | Nagai |
| 2004/0264396 A1 | 12/2004 | Ginzburg et al. |
| 2005/0060583 A1* | 3/2005 | Lin ............ 713/201 |
| 2005/0149376 A1 | 7/2005 | Guyan et al. |
| 2005/0182958 A1* | 8/2005 | Pham et al. ............ 713/200 |
| 2006/0155856 A1 | 7/2006 | Nakashima et al. |
| 2006/0217116 A1 | 9/2006 | Cassett et al. |
| 2006/0221953 A1 | 10/2006 | Basso et al. |
| 2006/0229025 A1 | 10/2006 | Gandhi et al. |
| 2006/0274750 A1 | 12/2006 | Babbar et al. |
| 2007/0174469 A1 | 7/2007 | Andress et al. |
| 2007/0178876 A1 | 8/2007 | Yaqub et al. |
| 2007/0201369 A1 | 8/2007 | Pedersen et al. |
| 2007/0245171 A1 | 10/2007 | Ohly et al. |
| 2007/0286222 A1 | 12/2007 | Balasubramanian |
| 2007/0294410 A1 | 12/2007 | Pandya et al. |
| 2008/0019339 A1 | 1/2008 | Raju et al. |
| 2008/0102815 A1 | 5/2008 | Sengupta et al. |
| 2008/0144497 A1 | 6/2008 | Ramprashad et al. |
| 2008/0183857 A1 | 7/2008 | Barfield et al. |
| 2008/0234012 A1 | 9/2008 | Liu et al. |
| 2009/0005127 A1 | 1/2009 | Frenger et al. |
| 2009/0022095 A1 | 1/2009 | Spaur et al. |
| 2009/0049518 A1 | 2/2009 | Roman et al. |
| 2009/0183186 A1 | 7/2009 | Murtagh |
| 2009/0296641 A1* | 12/2009 | Bienas et al. ............ 370/329 |
| 2009/0318124 A1 | 12/2009 | Haughn |
| 2009/0325512 A1 | 12/2009 | Granlund et al. |
| 2010/0045422 A1 | 2/2010 | Teng et al. |
| 2010/0142477 A1 | 6/2010 | Yokota |
| 2010/0144332 A1 | 6/2010 | Savoor |
| 2010/0231383 A1 | 9/2010 | Levine et al. |
| 2010/0279745 A1 | 11/2010 | Westcott et al. |
| 2010/0285776 A1 | 11/2010 | de Froment |
| 2010/0287281 A1 | 11/2010 | Tirpak |
| 2010/0322124 A1 | 12/2010 | Luoma et al. |
| 2011/0003592 A1 | 1/2011 | Matsumoto |
| 2011/0019557 A1 | 1/2011 | Hassan et al. |
| 2011/0028085 A1 | 2/2011 | Waung et al. |
| 2011/0029658 A1* | 2/2011 | Werth et al. ............ 709/224 |
| 2011/0054879 A1 | 3/2011 | Bogsanyl et al. |
| 2011/0182220 A1 | 7/2011 | Black et al. |
| 2011/0185202 A1 | 7/2011 | Black et al. |
| 2011/0188394 A1 | 8/2011 | Seo |
| 2012/0020266 A1 | 1/2012 | Sun et al. |
| 2012/0129503 A1 | 5/2012 | Lindeman et al. |
| 2012/0134361 A1 | 5/2012 | Wong et al. |
| 2012/0185577 A1 | 7/2012 | Giaretta et al. |
| 2012/0236772 A1 | 9/2012 | Kondratiev |
| 2012/0257512 A1 | 10/2012 | Lim |
| 2012/0270538 A1 | 10/2012 | Meylan et al. |
| 2013/0052965 A1 | 2/2013 | Meylan et al. |
| 2013/0165181 A1 | 6/2013 | Hasegawa |
| 2013/0217331 A1 | 8/2013 | Manente |
| 2013/0217357 A1 | 8/2013 | Menezes et al. |
| 2013/0225100 A1 | 8/2013 | Chen et al. |
| 2014/0286256 A1 | 9/2014 | Chowdhury et al. |

FOREIGN PATENT DOCUMENTS

| | | |
|---|---|---|
| EP | 2019517 A1 | 1/2009 |
| JP | H10178453 A | 6/1998 |
| JP | 2001339465 A | 12/2001 |
| JP | 2002091841 A | 3/2002 |
| JP | 2004509539 A | 3/2004 |
| JP | 2004297218 A | 10/2004 |
| JP | 2008048072 A | 2/2008 |
| JP | 2008072568 A | 3/2008 |
| JP | 2008187377 A | 8/2008 |
| JP | 2009021966 A | 1/2009 |
| JP | 2009038653 A | 2/2009 |
| JP | 2009182443 A | 8/2009 |
| JP | 2009540687 A | 11/2009 |
| JP | 2010074818 A | 4/2010 |
| JP | 2010183414 A | 8/2010 |
| JP | 2011530860 A | 12/2011 |
| JP | 2012529807 A | 11/2012 |
| KR | 20110063735 A | 6/2011 |
| KR | 20110064066 A | 6/2011 |
| WO | WO-0223362 A1 | 3/2002 |
| WO | WO-03036491 A1 | 5/2003 |
| WO | WO-2005109792 A1 | 11/2005 |
| WO | WO-2007146549 A2 | 12/2007 |
| WO | WO-2009096410 A1 | 8/2009 |
| WO | WO-2010016849 A1 | 2/2010 |
| WO | WO-2011023096 A1 | 3/2011 |
| WO | WO-2011146831 A1 | 11/2011 |

OTHER PUBLICATIONS

Larsson H Levkowetz H Mahkonen T Kauppinen Ericsson C: "A Filter Rule Mechanism for Multi-access Mobile IPv6; draft-larsson-monami 6—filter-rules-02.txt" IETF Standard-Working-Draft, Internet Engineering Task Force, IETF, CH, No. 2, Mar. 5, 2007 (Mar. 5, 2007), XP015050112, ISSN: 0000-0004.
Pering, T. et al. (2005). CoolSpots: Reducing the Power Consumption of Wireless Mobile Devices with Multiple Radio lnterfaees. International Conference on MobiTe SysEems, Applications and Services.
(MobiSys'06), 220-232. See Section 5.
Taiwan Search Report—TW100105127—TIPO—Jan. 9, 2014.
Ananthanarayaran G., et al ., "A New Communications API", Electrical Engineering and Computer SciencesUniversity of California at Berkeley, May 25, 2009 (May 25, 2009), pp. 1-14, XP002676108, Retrieved from the Internet: URL:http://www.eecs.berkeley.edu/Pubs/TechRpts/2009/EECS-2009-84.pdf [retrieved on May 16, 2012].
Andrea Passarella: "Power Management Policies for Mobile Computing", Feb. 1, 2005 (Feb. 1, 2005), pp. 1-151, XP055019616, Retrieved from the Internet: URL:http://cnd.iit.cnr.it/andrea/docs/

(56) References Cited

OTHER PUBLICATIONS passarella_phd_thesis.pdf [retrieved-on Feb. 16, 2012] * chapter 5.3, 5.3.1.

Chen L., et al., "QoS aware power efficiency in IEEE 802.11 LAN", Consumer Communications and Networking Conference, 2005. CCNC. 2005 Second IEEE, IEEE, Piscataway, NJ, USA, Jan. 3, 2005 (Jan. 3, 2005), pp. 85-90, XP010787616, DOI: 10.1109/CCNC.2005.1405149, ISBN: 978-0-7803-8784-3 * chapter III C * figures 3-2.

Hare, et al., "A Network-Assisted System for Energy Efficiency in Mobile Devices," 2011 Third International Conference on Communication Systems and Networks, COMSNETS, pp. 1-10, Jan. 2011.

Kravets R et al: "Application-Driven Power Management for Mobile Communication" Wireless Networks, ACM, New York, NY, US, vol. 6, No. 4, Sep. 2000 (Sep. 2000), pp. 263-277, XP001036334 ISSN: 1022-0038.

Liu China MOB1 Le Yuri Ismai Lov Ericsson Z Cao China Mobile D: "Socket API Extension for MIF Host; draft-liu-mif-api-extension-03.txt", Socket API Extension for MIF Host; Draft-LIU-MIF-API-EXTENSION-03.TXT, Internet Engineering Task Force, IETF; StandardWorkingDraft, Internet Society (ISOC) 4, Rue Des Falaises CH-1205 Geneva, Switzerland, No. 3, Oct. 25, 2010 (Oct. 25, 2010), pp. 1-8, XP015072273, [retrieved on Oct. 25, 2010] abstract * chapters 3-7 * figure 1.

Liu China Mobile Yuri Ismailov Ericsson Z Cao China Mobile D: "Socket API Extension for MIF Host; draft-liu-mif-api-extension-04.txt", Socket API Extension for MIF IETF; Standardworki NGDraft, Internet Society (ISOC) 4, Rue Des Falaises CH—1205 Geneva, Switzerland, No. 4, Mar. 15, 2011 (Mar. 15, 2011), pp. 1-9, XP015074974, [ retrieved on Mar. 15, 2011] abstract *chapter 3-5 * figure 1.

Liu H., et al: "TailTheft: Leveraging the Wasted Time for Saving Energy in Cellular Communications", MobiArch '11 Proceedings of the sixth international workshop on MobiArch Jun. 28, 2011 (Jun. 28, 2011), pp. 31-36, XP002676107, ISBN: 978-1-4503-0740-6 Retrieved from the Internet: URL:http://delivery.acm.org/10.1145/2000000/1999925/p31-liu.pdf"ip=145.64.134.245&acc=ACTIVE%20SERVICE&CFID=103451177&CFTOKEN=63558822&_acm_=1337160633_c5b6dc53c6b1c9 77ac53b9dfb0180831 [retrieved on May 16, 2012].

* cited by examiner

METHODS AND APPARATUS PROVIDING INTELLIGENT RADIO SELECTION FOR LEGACY AND NON-LEGACY APPLICATIONS

CLAIM OF PRIORITY UNDER 35 U.S.C. §119

The present Application for Patent claims priority to U.S. Provisional Application No. 61/305,087 entitled "METHOD AND APPARATUS FOR FACILITATING INTERFACE SELECTION WITH LEGACY AND NON-LEGACY APPLICATIONS" filed Feb. 16, 2010, and assigned to the assignee hereof and hereby expressly incorporated by reference herein.

The present Application for Patent claims priority to U.S. Provisional Application No. 61/305,091 entitled "SYSTEMS, APPARATUS AND METHODS TO FACILITATE FLOW MOBILITY" filed Feb. 16, 2010, and assigned to the assignee hereof and hereby expressly incorporated by reference herein.

BACKGROUND

Field

The present application relates generally to the operation of wireless communication systems, and more particularly, to methods and apparatus providing intelligent radio selection for legacy and non-legacy applications.

Background

Applications (Apps) or device applets are now available that operate to provide a wide range of add-on services and features to wireless devices. For example, it is now possible for wireless devices to download and launch device applets to perform value added functions such as, shopping, searching, position location, driving navigation or an array of other functions. Network and application providers generally offer these device applets to device users for additional fees. Thus, the use of device applets increases the functionality and usability of wireless devices and offers device users features and convenience not originally available on the devices themselves.

Typically a wireless device interfaces with one or more communication networks using any of a plurality of radios. For example, the wireless device may include a variety of radios providing communications using Cellular, WiFi, Bluetooth or other types of radio access technologies. Accordingly, applications executing on the wireless device are typically provided with a default routing that determine the radio and associated radio channel the applications will use to communicate with the appropriate network.

However, there is an increased interest in intelligently selecting the radio through which a given application communicates. This is due, in part, to an increase in the number of multi-radio devices (e.g. 3G/WiFi devices) and an increase in network traffic that can create capacity problems for operators. Thus, with respect to such capacity problems, it would be desirable to offload traffic to alternative radios where such offloading is possible and does not significantly degrade application performance or where application performance actually may be improved based on intelligent radio selection.

Unfortunately, proposed solutions to affect radio selection may be inefficient, costly and may not be applicable to legacy applications. For example, one proposed solution would require all applications to be changed to explicitly indicate a preferred radio for use. This solution would be very inefficient and costly in that applications at each wireless device would need to be upgraded to specify a radio preference and would have to account for radio resources available at each device. Furthermore, such a solution may not be feasible with legacy applications where such upgrades are not possible.

Therefore, it would be desirable to have an efficient and cost effective mechanism that operates to provide intelligent radio selection for both legacy and non-legacy applications so that each application utilizes the most desirable radio available.

SUMMARY

In one or more aspects, an intelligent radio selection system, comprising methods and apparatus, operates to provide intelligent radio selection for both legacy and non-legacy applications so that each application utilizes the most desirable radio available.

In an aspect, a method is provided for intelligent radio selection at a device. The method comprises intercepting a networking function call from an application desiring radio access, selecting a radio from a plurality of candidate radios based on selection criteria, and binding the radio to the application.

In an aspect, an apparatus is provided for intelligent radio selection at a device. The apparatus comprises means for intercepting a networking function call from an application desiring radio access, means for selecting a radio from a plurality of candidate radios based on selection criteria, and means for binding the radio to the application.

In an aspect, an apparatus is provided for intelligent radio selection at a device. The apparatus comprises a connectivity engine configured to intercept a networking function call from an application desiring radio access and select a radio from a plurality of candidate radios based on selection criteria, and a socket component configured to bind the radio to the application.

In an aspect, a computer program product is provided for intelligent radio selection at a device. The computer program product comprises a computer-readable medium embodying codes executable by a processor to intercept a networking function call from an application desiring radio access, select a radio from a plurality of candidate radios based on selection criteria, and bind the radio to the application.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes implementations of an intelligent radio selection system that operates to provide intelligent radio selection for both legacy and non-legacy applications so that each application utilizes the most desirable radio available.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.15, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

Figure 1:
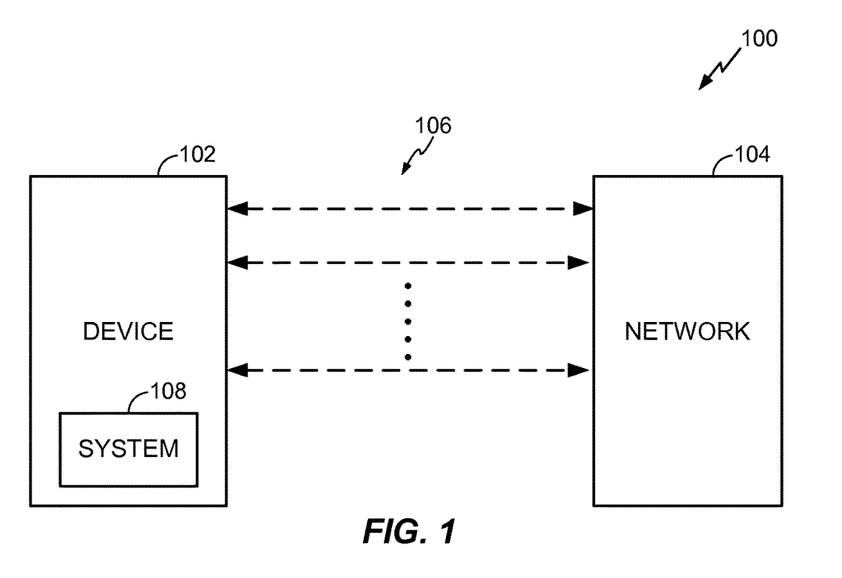
FIG. 1 shows an exemplary network environment illustrating aspects of an intelligent radio selection system.

FIG. 1 shows an exemplary network environment 100 illustrating aspects of an intelligent radio selection system. The network environment 100 comprises device 102 and communication network 104. The device 102 comprises a plurality of radios to communicate with the network 104 using corresponding radio channels 106. The device 102 also comprises an intelligent radio selection system 108 that operates to select a particular radio to be used by a particular application.

During operation, the device 102 executes applications which can interface with the network 104 using any of the plurality of radios. For example, an executing application issues a networking function call, such as a socket layer call, to request a network resource for communication with the network 104. Conventional systems typically process the socket layer call based on a default routing configuration to bind a pre-determined radio resource to the application.

However, in various implementations, the intelligent radio selection system operates to intercept the networking function call from the application and select the appropriate radio for use by the application. A binding process is then performed to bind the application to the network resource (i.e., the radio that has been selected). Since the intelligent radio selection system performs in response to the normal operations of the applications to use a radio resource, the system can operate with both legacy and non-legacy applications without any application changes or upgrades. A more detailed description of the intelligent radio selection system is provided below.

Figure 2:
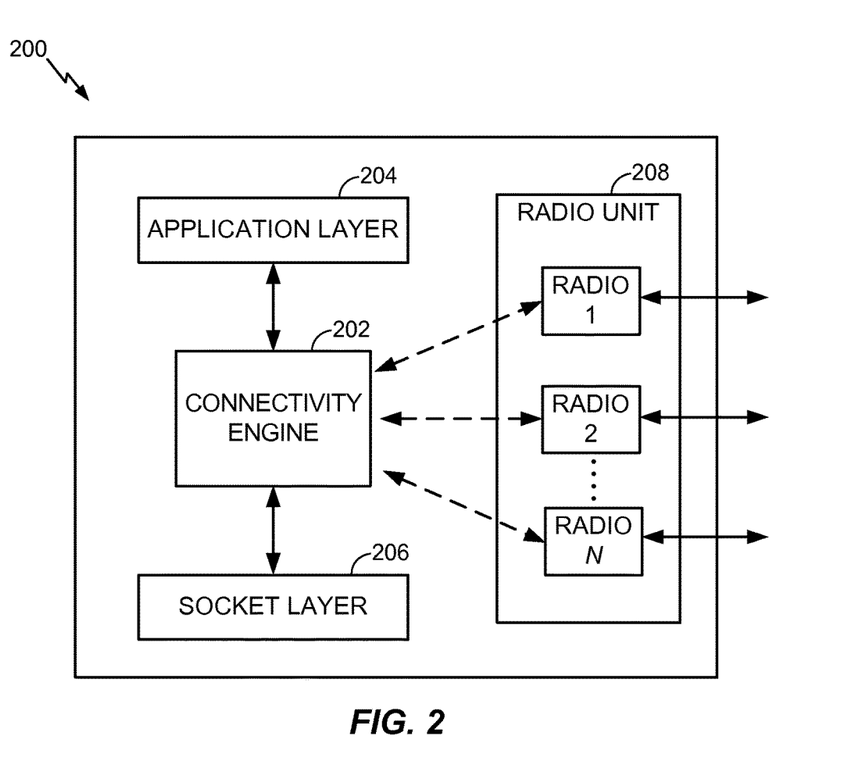
FIG. 2 shows an exemplary device architecture for intelligent radio selection.

FIG. 2 shows an exemplary device architecture 200 providing an intelligent radio selection system. The architecture 200 comprises connectivity engine 202, application layer 204, socket layer 206, and radio unit 208. The application layer 204 comprises applications which may execute to provide various functions and communicate with outside networks using one or more of the radios of the radio unit 208. The socket layer 206 issues calls (or requests) to establish a binding between a particular application and a radio. The connectivity engine 202 operates to provide intelligent radio selection in accordance with the various aspects presented herein.

During operation, the connectivity engine 202 intercepts networking function calls, such as socket layer calls, from an application at the application layer 204. Once the networking function calls are intercepted, the connectivity engine 202 operates to select an ideal radio/interface from the plurality of candidate radios within radio unit 208. For example, the connectivity engine 202 selects the radio based on a variety of selection criteria. When a radio/interface is selected, the connectivity engine 202 uses socket layer functions of the socket layer 206 to establish a connection between the application and the radio/interface that has been selected. For example, the socket layer functions may include a connect function "Connect( )", a bind function "Bind( )", a set socket option function "Setsockopt( )", and/or any other suitable socket layer functions.

Thus, the device architecture 200 provides for intelligent radio selection so that both legacy and non-legacy applications executing at a device can be bound to the most preferred radio/interface.

Figure 3:
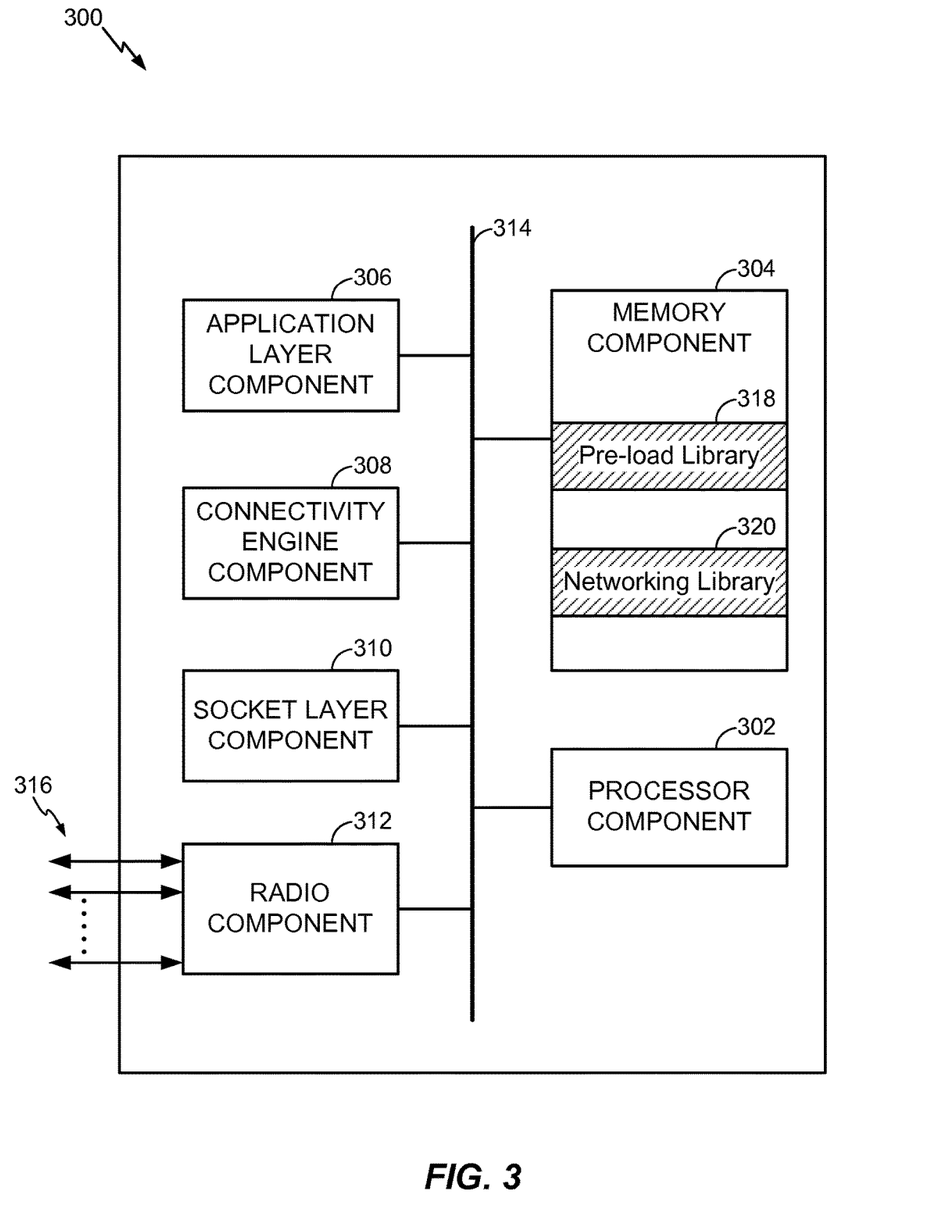
FIG. 3 shows an exemplary device configured to provide intelligent radio selection.

FIG. 3 shows an exemplary wireless device 300 providing intelligent radio selection. The device 300 comprises processor 302, memory 304, radio component 312, application layer component 306, socket layer component 310, and connectivity engine component 308 all coupled to communicate using communication bus 314. It should be noted that the device 300 is just one implementation and that other implementations are possible.

In one aspect, processor 302 comprises at least one of a CPU, processor, gate array, hardware logic, memory elements, and/or hardware executing software. The processor 302 operates to control the operation of the device 300 so that applications executing at the device 300 can be bound to the most desirable radio. In one implementation, the processor 302 is configured to execute computer-readable instructions related to performing any of a plurality of functions. For example, the processor 302 operates to analyze information received or communicated from the device 300 to effectuate intelligent radio selection. In another aspect, the processor 302 operates to generate information that can be utilized by the memory 304, radio component 312, application layer component 306, socket layer component 310, and/or connectivity engine component 308 to effectuate intelligent radio selection.

The radio component 312 comprises hardware and/or a processor executing software that is configured to provide a plurality of radios/interfaces that can be used to interface the device 300 with a plurality of external entities, such as external communication networks using a plurality of radio channels 316. For instance, radio component 312 provides radios/interfaces to communicate using Cellular, WiFi, Bluetooth, or any other technologies to communicate with communication networks using the radio channels 316.

The application layer component 306 comprises hardware and/or a processor executing software that is configured to store and/or execute one or more applications on the device 300. In one implementation, the application layer component 306 is configured to allow applications to initiate networking function calls to request networking services, such as requesting connection to a radio/interface for the purpose of communicating with an external network or system.

The socket layer component 310 comprises hardware and/or a processor executing software that is configured to perform socket layer functions. In one implementation, the socket layer functions comprise such functions as Connect( ), Bind( ), and Setsockopt( ). A Connect( ) function operates to establish a connection between an application and a particular radio/interface. For example, the particular radio/interface can be selected from the plurality of candidate radios provided by the radio component 312. In an aspect, socket layer component 310 is configured to perform a variety of socket layer functions or commands.

The connectivity engine component 308 comprises hardware and/or a processor executing software that is configured to perform an assessment of system resources to select a particular radio for use by an application. In various implementations, the connectivity engine component 308 is configured as a centralized radio controller to select the particular radio based on one or more of the following selection criteria.
1. User Policy—policy set by the device user regarding radio access by applications executing at the device.
2. Operator Policy—policy set by network operator regarding network access by devices or applications . . . .
3. Radio metrics—measurements of radio performance or other types of measurements that are used to select the most preferred radio for a particular application or operating environment.
4. Application requirements—requirements associated with requesting applications, such as bandwidth requirements or latency/performance requirements.
5. Network usability—information regarding the availability of a particular network on a particular radio interface.
6. Vendor Supplied Metrics—information to translate from radio metrics such as Receive Signal Strength Indication and Packet Loss Rate to the throughput and latency available for a particular radio interface.
7. Access Point Availability—information specifying the unique identifier for access points congested by lots of traffic from other devices or those that can configure a radio link but do not forward packets to the network.

The memory 304 comprises RAM, ROM, EEPROM or any other type of memory device that operates to allow information to be stored and retrieved at the device 300. In one implementation, the memory 304 is configured to store computer-readable instructions executed by processor 302. Memory 304 may also be configured to store any of a plurality of other types of data including data generated by any of the processor 302, radio component 312, application layer component 306, socket layer component 310, and/or connectivity engine component 308. Memory 304 can be configured in a number of different configurations, including as random access memory, battery-backed memory, hard disk, magnetic tape, etc. Various features can also be implemented upon memory 304, such as compression and automatic back up.

The memory 304 is configured to store a pre-load library 318 and a networking library 320. In one implementation, the networking library 320 comprises the POSIX or Berkeley sockets application programming interface (API) that includes functions for developing applications in the C programming language that perform inter-process communication, most commonly for communications across a computer network. For example, the POSIX API comprises functions, such as Connect( ), Bind( ), and Setsockopt( ).

The pre-load library 318 is used to intercept socket calls from applications at the application layer 306. For example, the pre-load library 318 comprises at least a subset of the API functions provided by the networking library 320, and is linked into the execution environment at a higher priority than the networking library 320.

During operation, the system configures the environment that a linker uses when the device first boots up. In one implementation, the linker operates to check the environment for libraries to load before starting normal library linking. Typically, the linker loads the networking library 320 that provides the networking API. Applications use that interface to create and connect sockets to establish network communications. For example, in one implementation, the linker scans an application and its dependencies so everything is loaded into memory. The linker is configured to load the pre-load library 318 before other libraries and populates the look-ups so libraries loaded subsequently are satisfied and can use the pre-load library 318.

The pre-load library 318 comprises at least a subset of the API sockets that the networking library 320 provides. When the application makes a networking function call to create or connect a socket, this call is processed (or intercepted) by the pre-load library 318. For example, the application provides a function pointer for the Connect( ) function with arguments or attributes, such as an IP Address, Destination, and File Descriptor that are provided to the Connect( ) function.

The pre-load library 318 then generates a request to a centralized radio control entity to choose the most appropriate network interface for the specified connection. For example, the pre-load library 318 sends the request to the connectivity engine component 308 to determine the appropriate radio to be used. After the appropriate radio is selected, calls to the networking library 320 sockets API are performed to complete the connection setup before control is returned to the pre-load library 318. For example, the connectivity engine component 308 operates to call functions of the networking library 320 to bind the radio that has been selected to the requesting application.

The connectivity engine component 308 is configured to intelligently select a radio from the plurality of candidate radios in various ways. For example, the connectivity engine component 308 may be configured to select a radio using one or more of the above selection criteria. Once a radio is selected, the connectivity engine component 308 binds the radio to the application. For example, in one implementation, binding is performed by calling into the original networking library 320. The runtime linker provides an expert interface where it is possible to specify specific library identifiers and function identifiers and store this information. Thus, functions at the connectivity engine component 308 and the pre-load library 318 can easily access functions, such as a Bind( ) function, in the networking library 320 to bind the radio that has been selected to the application. A more detailed description of the operation of the device 300 to provide intelligent radio selection is provided below.

In various implementations, the intelligent radio selection system comprises a computer program product having one or more program instructions ("instructions") or sets of "codes" stored or embodied on a computer-readable medium. When the codes are executed by at least one processor, for instance, processor 302, their execution causes the processor 302 to control the device 300 to provide the functions of the intelligent interface selection system described herein. For example, the computer-readable medium comprises a floppy disk, CDROM, memory card, FLASH memory device, RAM, ROM, or any other type of memory device or computer-readable medium that interfaces to the device 300. In another aspect, the sets of codes may be downloaded into the device 300 from an external device or communication network resource. The sets of codes, when executed, operate to provide aspects of the intelligent interface selection system described herein.

Figure 4:
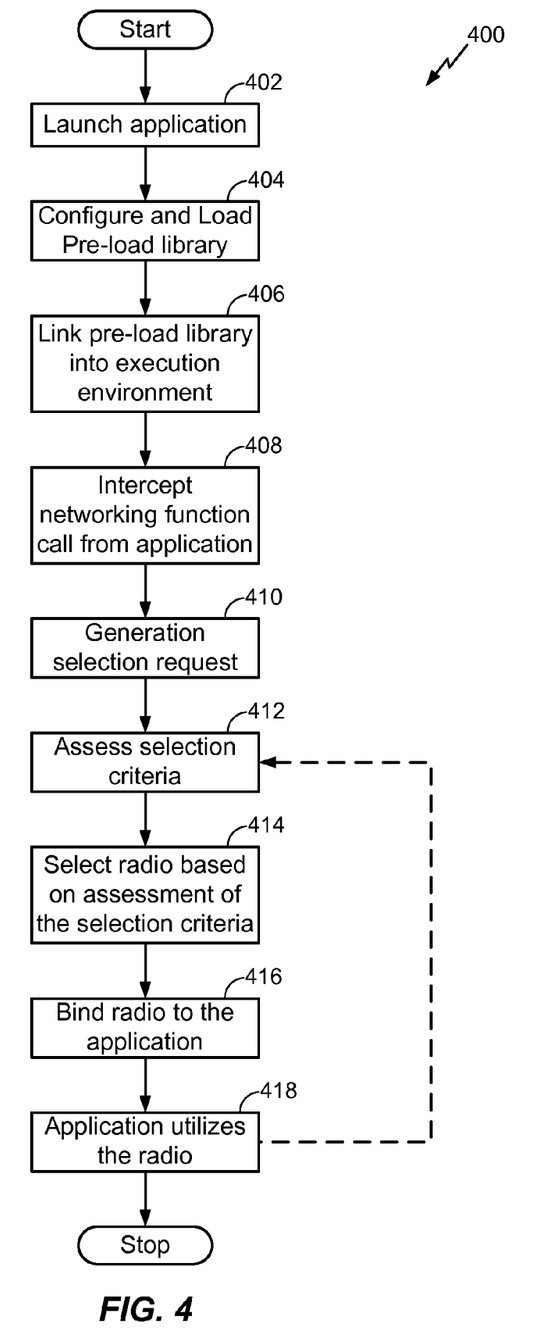
FIG. 4 shows an exemplary method for providing intelligent radio selection.

FIG. 4 shows an exemplary method 400 for providing intelligent radio selection. For clarity, the method 400 is described below with reference to the device 300 shown in FIG. 3. In one implementation, the processor 302 executes one or more sets of codes to control the functional elements of the device 300 to perform the functions described below.

At block 402, an application is launched. The application may be a legacy or non-legacy application that is part of the application layer component 306. For example, the application may be a network browser that generates a networking function call to connect to a wireless network using a radio available at the radio component 312.

At block 404, a pre-load library is configured and loaded. For example, the pre-load library 318 comprises a subset of the networking functions that are provided in the networking library 320 typically used by applications to assess communication networks. The networking functions in the pre-load library 318 are configured to intercept networking function calls from applications executing at a device. For example, the pre-load library 318 comprises POSIX socket functions that can be used to intercept socket calls by applications executing at the device 300. In one implementation, the pre-load library 318 in stored in memory 304.

In one implementation, the pre-load library 318 functions are configured to receive arguments passed from calling applications and use these arguments to generate a request to the connectivity engine component 308 to select the radio best suited for the application's purpose.

At block 406, the pre-load library is linked into the execution environment. For example, the processor 302 links the pre-load library 318 into the execution environment at a higher priority than the networking library 320. Thus, networking functions calls by applications will be intercepted and processed by functions in the pre-load library 318 and not processed by similar functions in the networking library 320.

At block 408, a networking function call from the application is intercepted. For example, the networking function call may be a POSIX socket function call, such as the Connect( ) function. The application generates the networking function call to connect to a radio to allow communication with external networks. Due to the linking of the pre-load library 318 into the execution environment at a higher priority than the networking library 320, the networking function call is intercepted (or processed) by the functions in the pre-load library 318.

At block 410, the called function in the pre-load library 318 generates a selection request to the connectivity engine component 308 to select the appropriate radio for use by the application. The request includes any information that is part of the selection criteria used by the connectivity engine component 308 to select the appropriate radio for use by the application.

At block 412, selection criteria are assessed. In one implementation, the connectivity engine component 308 operates to assess the selection criteria described above. For example, the connectivity engine 308 communicates with the radio component 312 to assess radio metrics that are part of the selection criteria.

At block 414, a radio is selected based on the assessment of the selection criteria. For example, the connectivity engine component 308 operates to select the radio that best matches the selection criteria.

At block 416, the radio that has been selected is bound to the application. For example, in one implementation, the connectivity engine component 308 calls a Bind( ) function of the networking library 320 to bind the radio that has been selected to the application. For example, the connectivity engine component 308 is aware of the networking library 320 and how to access its functions directly without being intercepted by the pre-load library 318.

At block 418, the application then utilizes the radio that has been selected for network communications.

In an optional operation, the method proceeds to block 412 where the connectivity engine component 308 operates to perform periodic assessment of the selection criteria to determine if the current radio best matches the selection criteria. If it is determined after another assessment of the selection criteria that a radio other than the current radio best matches the selection criteria, then the connectivity engine 308 can destroy the connection as a means to trigger the application into restarting the connection to select a different radio for the new connection. Thus, the optional operation allows the selection criteria to be periodically assessed to assure that the most appropriate radio is selected to conduct the desired communication.

Therefore, the method 400 provides intelligent radio selection for use with legacy and non-legacy applications. It should be noted that the method 400 is just one implementation and that the operations of the method 400 may be rearranged or otherwise modified such that other implementations are possible.

Figure 5:
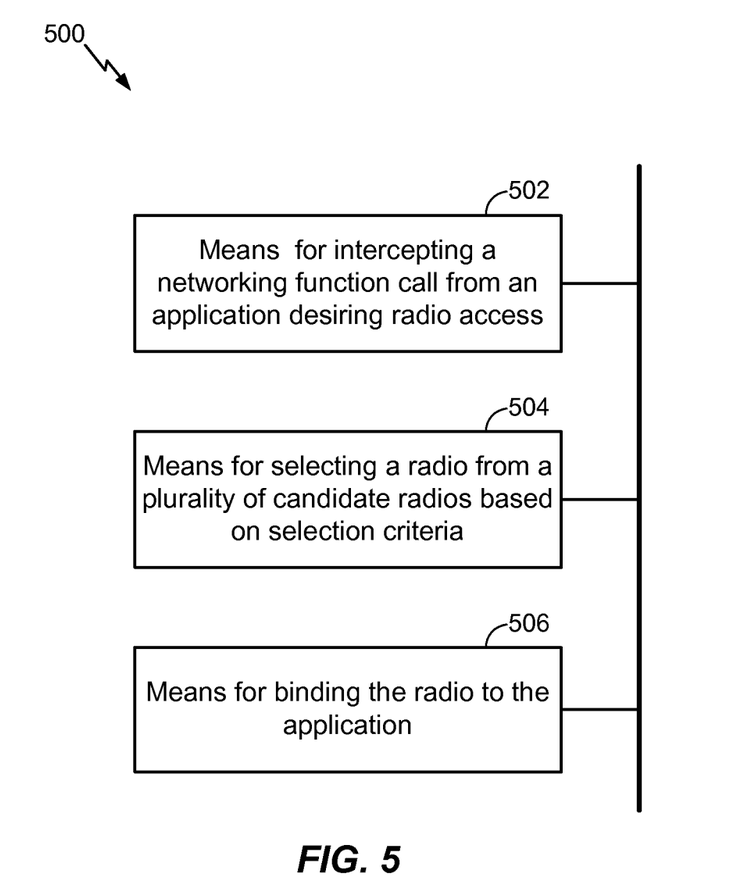
FIG. 5 shows an exemplary apparatus that provides intelligent radio selection.

FIG. 5 shows an exemplary apparatus 500 that provides intelligent radio selection. For example, the apparatus 500 is suitable for use as the device 102 shown in FIG. 1. In an aspect, the apparatus 500 is implemented by at least one integrated circuit comprising one or more modules configured to provide aspects of an intelligent radio selection system as described herein. For example, in an aspect, each module comprises hardware and/or hardware executing software.

The apparatus 500 comprises a first module comprising means (502) for intercepting a networking function call from an application desiring radio access, which in an aspect comprises the pre-load library 318.

The apparatus 500 also comprises a second module comprising means (504) for selecting a radio from a plurality of candidate radios based on selection criteria, which in an aspect comprises the connectivity engine module 308.

The apparatus 500 also comprises a third module comprising means (506) for binding the radio to the application, which in an aspect comprises the connectivity engine module 308.

Flow Mobility

In addition to intelligent interface selection, the system operates to provide flow mobility as described below.

Figure 6:
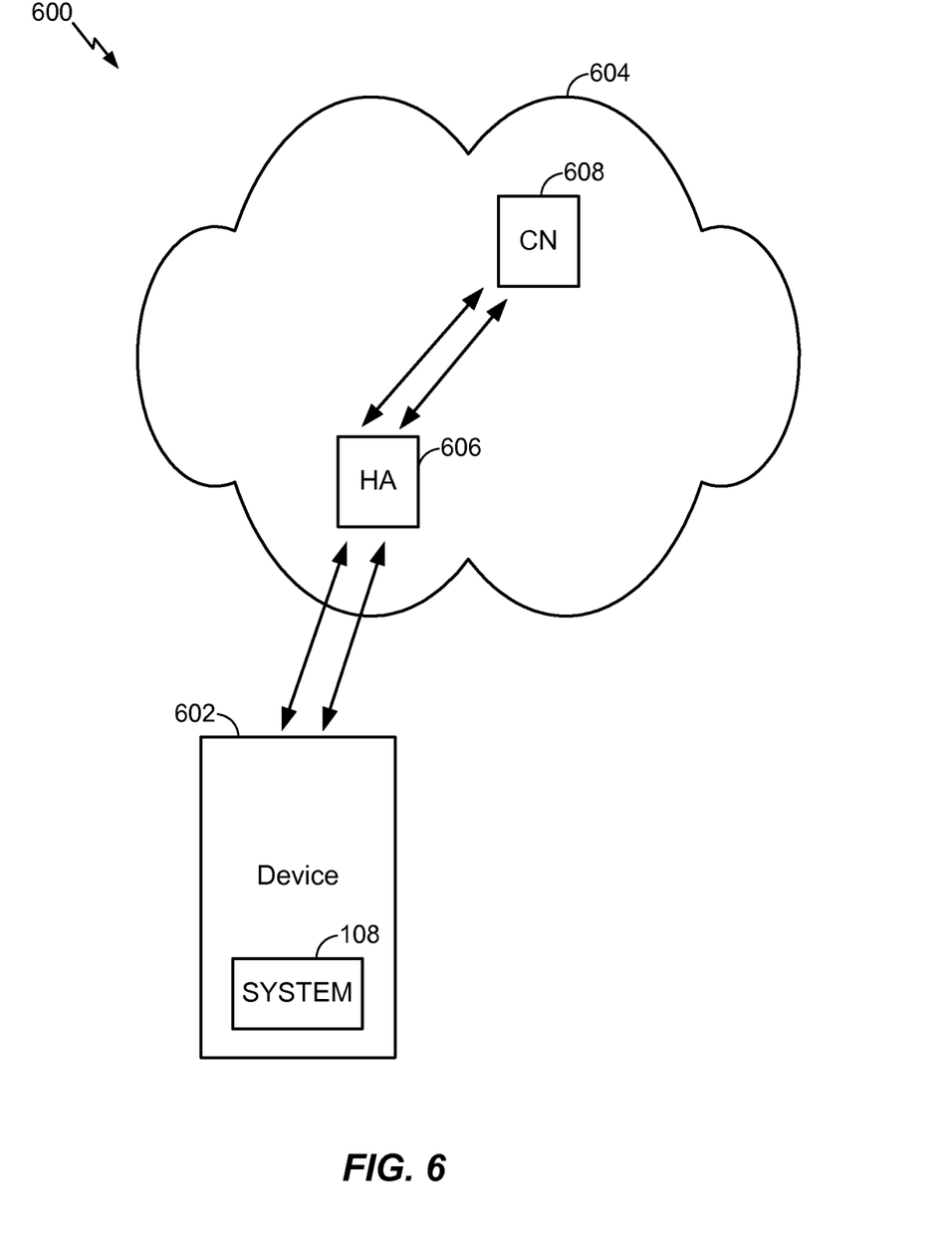
FIG. 6 shows an exemplary communication network that illustrates aspects of flow mobility provided by the intelligent radio selection system.

FIG. 6 shows an exemplary communication network 600 that illustrates aspects of flow mobility provided by the intelligent radio selection system. The communication network 600 comprises device 602 configured to communicate with network 604 using one or more communication interfaces 606. For example, the communication interfaces 606 comprise Cellular, WiFi, Bluetooth and any other suitable communication technology.

During operation, an application at the device 602 generates a connection request to communicate with a network resource. As discussed above, the system 108 performs an intelligent interface selection to satisfy the request. To provide aspects of flow mobility, the system operate to dynamically generate a flow binding rule that specifies a particular communication interface selected from the interfaces 606 to encapsulate packets for routing between a home agent 608 and the device 602.

In conventional systems, the IP flow binding is usually described in a 5-tuple comprising a source IP address, destination IP address, source port, destination port, and protocol. Thus, this description is provided by the handset 602 to the home agent 608 and packets matching this description will be routed accordingly by the home agent 608. Unfortunately, registering flows using the 5-tuple may not be bandwidth efficient since all the elements of the 5-tuple are transmitted even though the only tuple that changes may be the source port.

In various implementations, the system operates to dynamically generate a flow binding rule when a connection is started so that a data flow can be transmitted over the most appropriate radio/interface. For example, in one implementation, the system allocates an ephemeral port to be used by the application for network communications. The system 108 then dynamically generates a flow binding rule based only on the ephemeral port which indicates that a particular data flow is to be associated with the ephemeral port and be transmitted on a particular radio/interface. By utilizing only the ephemeral port in the binding rule it is not necessary to transmit the entire 5-tuple to the home agent, which is more efficient than conventional systems since it saves transmission bandwidth.

In another implementation, an IPv6 address is dynamically generated for the connection. For example, a per connection IPv6 address belonging to the mobile node prefix is generated and assigned to the mobile IP address. Next, a flow binding rule based only on the per connection IPv6 address is dynamically generated.

In either of the above cases, the binding rule is then signaled to a Home Agent (HA) 608 on the network 604. The HA 608 operates to route packets to the device according to the binding rule. For example, data packets sent from a correspondent node (CN) 610 to the device are received at the HA 608 and then routed to the device 602 using the binding rule. The following methods describe aspects of flow mobility provided by the intelligent selection system.

Figure 7:
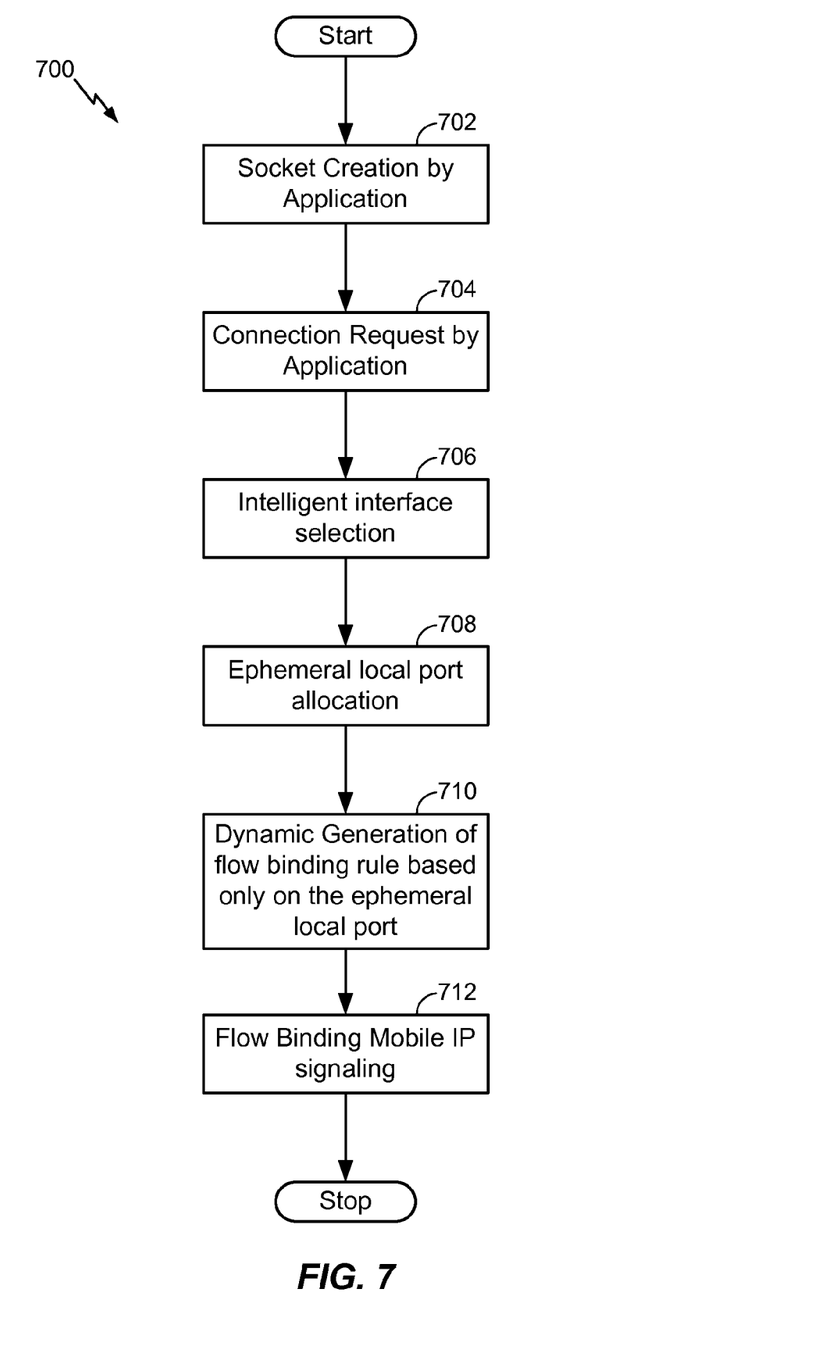
FIG. 7 shows an exemplary method for providing flow mobility.

FIG. 7 shows an exemplary method 700 for providing flow mobility. For clarity, the method 700 is described below with reference to the device 300 shown in FIG. 3 and the network 600 shown in FIG. 6. In one implementation, the processor 302 executes one or more sets of codes to control the functional elements of the device 300 to perform the functions described below.

At block 702, a socket is created by an application. For example, an application executing at the device 602 creates a socket to receive a data flow from a network resource that is part of the network 604.

At block 704, a networking function call from the application is intercepted. For example, the networking function call may be a POSIX socket function call, such as the Connect( ) function. The application generates the networking function call to connect to a radio to allow communication with external networks. Due to the linking of the pre-load library 318 into the execution environment at a higher priority than the networking library 320, the networking function call is intercepted (or processed) by the functions in the pre-load library 318.

At block 706, intelligent interface selection is performed to satisfy the networking function call. For example, blocks 408 to 414 of the method 400 are performed to select a radio/interface for use by the application. Thus, one of the interfaces 606 provided by the device 602 is selected for use by the application.

At block 708, an ephemeral local port is allocated. In one implementation, the connectivity engine 308 operates to allocate an ephemeral local port to the application. For example, an ephemeral (i.e., short-lived) port is a transport protocol port for IP communications that is selected from a pre-defined range. The allocation is temporary and only valid for the duration of the communication session. After completion of the communication session the port becomes available for reuse.

At block 710, a flow binding rule is dynamically generated based only on the ephemeral port. In one implementation, the connectivity engine 308 operates to dynamically generate the binding rule based only on the allocated ephemeral local port.

At block 712, the flow binding rule is signaled to a Home Agent associated with the device. For example, the connectivity engine 308 operates to transmit the flow binding rule to the home agent 608. The home agent 608 then uses the flow binding rule to route flows the device 602 using the appropriate radio/interface.

Therefore, the method 700 provides flow mobility in an intelligent radio selection system. It should be noted that the method 700 is just one implementation and that the operations of the method 700 may be rearranged or otherwise modified such that other implementations are possible.

Figure 8:
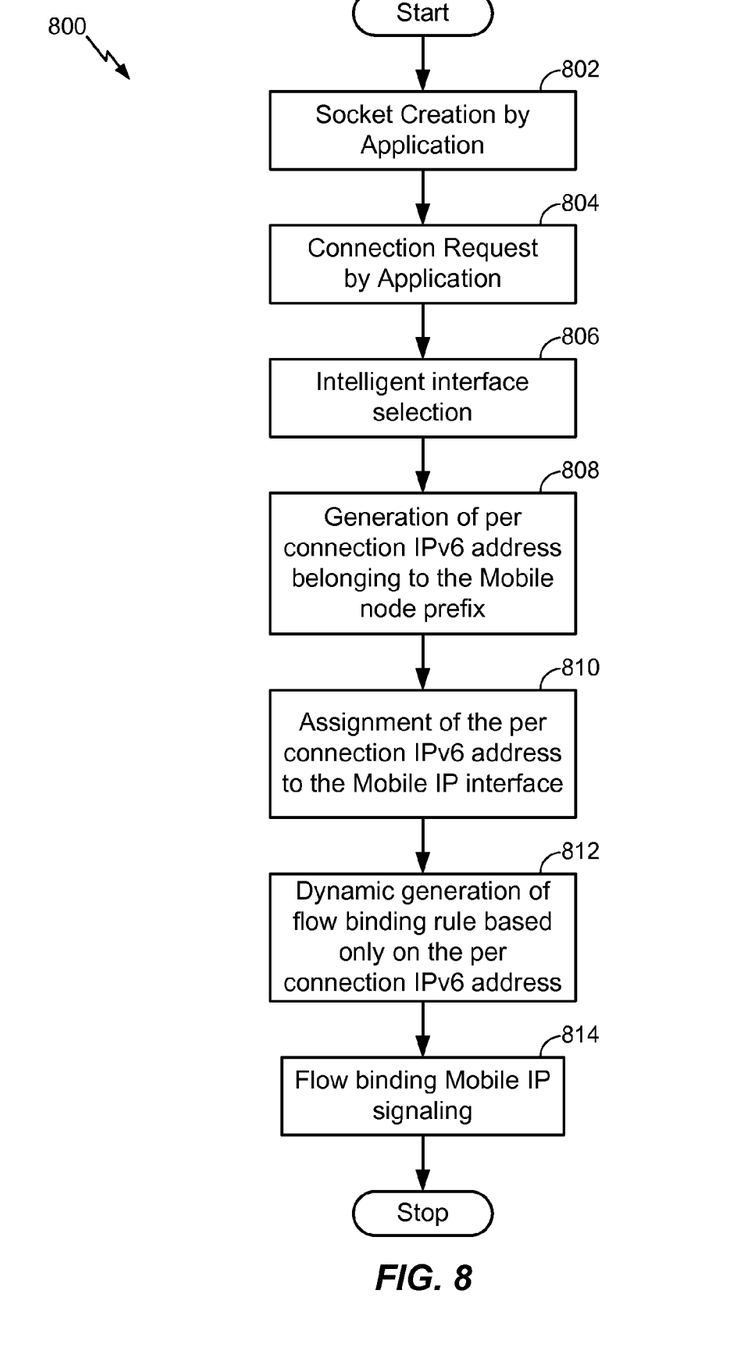
FIG. 8 shows an exemplary method for providing flow mobility.

FIG. 8 shows an exemplary method 800 for providing flow mobility. For clarity, the method 800 is described below with reference to the device 300 shown in FIG. 3 and the network 600 shown in FIG. 6. In one implementation, the processor 302 executes one or more sets of codes to control the functional elements of the device 300 to perform the functions described below.

At block 802, a socket is created by an application. For example, an application executing at the device 602 creates a socket to receive a data flow from a network resource that is part of the network 604.

At block 804, a networking function call from the application is intercepted. For example, the networking function call may be a POSIX socket function call, such as the Connect( ) function. The application generates the networking function call to connect to a radio to allow communication with external networks. Due to the linking of the pre-load library 318 into the execution environment at a higher priority than the networking library 320, the networking function call is intercepted (or processed) by the functions in the pre-load library 318.

At block 806, intelligent interface selection is performed to satisfy the networking function call. For example, blocks 408 to 414 of the method 400 are performed to select a radio/interface for use by the application. Thus, one of the interfaces 606 provided by the device 602 are selected.

At block 808, a per connection IPv6 address belonging to the mobile node prefix is generated. For example, the per connection IPv6 address is generated by the connectivity engine 308.

At block 810, the per connection IPv6 address is assigned to the mobile IP address. For example, the assignment is performed by the connectivity engine 308.

At block 812, a flow binding rule is dynamically generated based only on the per connection IPv6 address. In one implementation, the connectivity engine 308 operates to dynamically generate the binding rule based only on the per connection IPv6 address. This achieves efficient bandwidth utilization since other parameters, such as port or destination address are not necessary and would consume processing resources of the home agent.

At block 814, the flow binding rule is signaled to a Home Agent associated with the device. For example, the connectivity engine 308 operates to transmit the flow binding rule to the home agent 608. The home agent 608 then uses the flow binding rule to route flows the device 602 using the appropriate radio/interface.

Therefore, the method 800 provides flow mobility in an intelligent radio selection system. It should be noted that the method 800 is just one implementation and that the operations of the method 800 may be rearranged or otherwise modified such that other implementations are possible.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

What is claimed is:

1. A method for intelligent radio selection at a device, the method comprising:
   intercepting, using a first library comprising at least a subset of functions associated with a networking library, a socket layer call from an application desiring radio access;
   selecting a radio for the application to use from a plurality of candidate radios based on selection criteria and in response to a request to select a radio that is generated based on the intercepted socket layer call, wherein the selection criteria comprises a network policy set by a network operator, the network policy controlling network access by devices or applications; and binding the selected radio to the application using one or more socket layer functions.

2. The method of claim 1, wherein the first library comprises a pre-load library that is linked into an execution environment of the device.

3. The method of claim 2, wherein said intercepting comprises linking the pre-load library at a higher priority in the execution environment than the networking library.

4. The method of claim 1, wherein the one or more socket layer functions are included in the networking library.

5. The method of claim 1, wherein said request to select the radio is for a centralized radio controller to select the radio.

6. The method of claim 1, wherein the selection criteria further comprises at least one of application requirements, connection attributes, radio metric criteria, or a combination thereof.

7. The method of claim 1, wherein the candidate radios comprise at least one of Cellular radio access technology, WiFi radio access technology, Bluetooth radio access technology, or a combination thereof.

8. The method of claim 1, wherein the socket layer call includes at least one of Connect( ), Bind( ), Setsockopt( ), or a combination thereof.

9. The method of claim 1, wherein the application is one of a legacy application or a non-legacy application.

10. The method of claim 1, wherein said binding comprises:
allocating an ephemeral port to the radio;
generating a flow binding rule based on the ephemeral port; and
signaling the flow binding rule to a home agent.

11. The method of claim 1, wherein said binding comprises:
generating an IPv6 address to be associated with the radio;
generating a flow binding rule based on the IPv6 address; and
signaling the flow binding rule to a home agent.

12. An apparatus for intelligent radio selection at a device, the apparatus comprising:
means for intercepting, using a first library comprising at least a subset of functions associated with a networking library, a socket layer call from an application desiring radio access;
means for selecting a radio for the application to use from a plurality of candidate radios based on selection criteria and in response to a request to select a radio that is generated based on the intercepted socket layer call, wherein the selection criteria comprises a network policy set by a network operator, the network policy controlling network access by devices or applications; and
means for binding the selected radio to the application using one or more socket layer functions.

13. The apparatus of claim 12, wherein the first library comprises a pre-load library that is linked into an execution environment of the device.

14. The apparatus of claim 13, wherein said means for intercepting comprises means for linking the pre-load library at a higher priority in the execution environment than the networking library.

15. The apparatus of claim 12, wherein the one or more socket layer functions are included in the networking library.

16. The apparatus of claim 12, wherein said request to select the radio is for a centralized radio controller to select the radio.

17. The apparatus of claim 12, wherein the selection criteria further comprises at least one of application requirements, connection attributes, radio metric criteria, or a combination thereof.

18. The apparatus of claim 12, wherein the candidate radios comprise at least one of Cellular radio access technology, WiFi radio access technology, Bluetooth radio access technology, or a combination thereof.

19. The apparatus of claim 12, wherein the socket layer call includes at least one of Connect( ), Bind( ), Setsockopt( ), or a combination thereof.

20. The apparatus of claim 12, wherein the application is one of a legacy application or a non-legacy application.

21. The apparatus of claim 12, wherein said means for binding comprises:
means for allocating an ephemeral port to the radio;
means for generating a flow binding rule based on the ephemeral port; and
means for signaling the flow binding rule to a home agent.

22. The apparatus of claim 12, wherein said means for binding comprises:
means for generating an IPv6 address to be associated with the radio;
means for generating a flow binding rule based on the IPv6 address; and
means for signaling the flow binding rule to a home agent.

23. An apparatus for intelligent radio selection at a device, the apparatus comprising:
a connectivity engine configured to:
intercept, using a first library comprising at least a subset of functions associated with a networking library, a socket layer call from an application desiring radio access; and
select a radio for the application to use from a plurality of candidate radios based on selection criteria and in response to a request to select a radio that is generated based on the intercepted socket layer call, wherein the selection criteria comprises a network policy set by a network operator, the network policy controlling network access by devices or applications; and
a socket component configured to bind the radio to the application using one or more socket layer functions.

24. The apparatus of claim 23, wherein the first library comprises a pre-load library that is linked into an execution environment of the device.

25. The apparatus of claim 24, wherein said pre-load library is linked at a higher priority in the execution environment than the networking library.

26. The apparatus of claim 23, wherein the one or more socket layer functions are included in the networking library.

27. The apparatus of claim 23, wherein the selection criteria further comprises at least one of application requirements, connection attributes, radio metric criteria, or a combination thereof.

28. The apparatus of claim 23, wherein the candidate radios comprise at least one of Cellular radio access technology, WiFi radio access technology, Bluetooth radio access technology, or a combination thereof.

29. The apparatus of claim 23, wherein the socket layer call includes at least one of Connect( ), Bind( ), Setsockopt( ), or a combination thereof.

30. The apparatus of claim 23, wherein the application is one of a legacy application or a non-legacy application.

31. The apparatus of claim 23, wherein said socket component is configured to:
- allocate an ephemeral port to the radio;
- generate a flow binding rule based on the ephemeral port; and
- signal the flow binding rule to a home agent.

32. The apparatus of claim 23, wherein said socket component is configured to:
- generate an IPv6 address to be associated with the radio;
- generate a flow binding rule based on the IPv6 address; and
- signal the flow binding rule to a home agent.

33. A non-transitory computer-readable storage medium embodying codes for intelligent radio selection at a device, the codes executable by a processor to:
- intercept, using a first library comprising at least a subset of functions associated with a networking library, a socket layer call from an application desiring radio access;
- select a radio for the application to use from a plurality of candidate radios based on selection criteria and in response to a request to select a radio that is generated based on the intercepted socket layer call, wherein the selection criteria comprises a network policy set by a network operator, the network policy controlling network access by devices or applications; and
- bind the radio to the application using one or more socket layer functions.

34. The non-transitory computer-readable storage medium of claim 33, wherein the first library comprises a pre-load library that is linked into an execution environment of the device.

35. The non-transitory computer-readable storage medium of claim 34, wherein said codes are configured to cause the processor to link the pre-load library at a higher priority in the execution environment than the networking library.

36. The non-transitory computer-readable storage medium of claim 33, wherein the one or more socket layer functions are included in the networking library.

37. The non-transitory computer-readable storage medium of claim 33, wherein the selection criteria further comprises at least one of application requirements, connection attributes, radio metric criteria, or a combination thereof.

38. The non-transitory computer-readable storage medium of claim 33, wherein the candidate radios comprise at least one of Cellular radio access technology, WiFi radio access technology, Bluetooth radio access technology, or a combination thereof.

39. The non-transitory computer-readable storage medium of claim 33, wherein the socket layer call includes at least one of Connect( ), Bind( ), Setsockopt( ), or a combination thereof.

40. The non-transitory computer-readable storage medium of claim 33, wherein the application is one of a legacy application or a non-legacy application.

41. The non-transitory computer-readable storage medium of claim 33, wherein said codes are configured to cause the processor to:
- allocate an ephemeral port to the radio;
- generate a flow binding rule based on the ephemeral port; and
- signal the flow binding rule to a home agent.

42. The non-transitory computer-readable storage medium of claim 33, wherein said codes are configured to cause the processor to:
- generate an IPv6 address to be associated with the radio;
- generate a flow binding rule based on the IPv6 address; and
- signal the flow binding rule to a home agent.

* * * * *